W. W. JILZ.
Well-Auger.

No. 8,788. Reissued July 8, 1879.

Attest
W. H. H. Knight
Emanuel Blunt

Inventor:
William W. Jilz
By E. H. Ellsworth
His attorney.

N. PETERS, PHOTO-LITHOGRAPHER, WASHINGTON, D. C.

UNITED STATES PATENT OFFICE.

WILLIAM W. JILZ, OF CHICAGO, ILLINOIS.

IMPROVEMENT IN WELL-AUGERS.

Specification forming part of Letters Patent No. 117,542, dated August 1, 1871; Reissue No. 8,788, dated July 8, 1879; application filed June 5, 1879.

*To all whom it may concern:*

Be it known that I, WILLIAM WHEETEN JILZ, of Chicago, Illinois, formerly of Hamilton, in the county of Caldwell and State of Missouri, have invented a new and Improved Well-Auger; and I do hereby declare the following to be a full, clear, and exact description of the invention, which will enable others skilled in the art to which it appertains to make and use it, reference being had to the accompanying drawings, forming part of this specification, in which—

Figure 1:
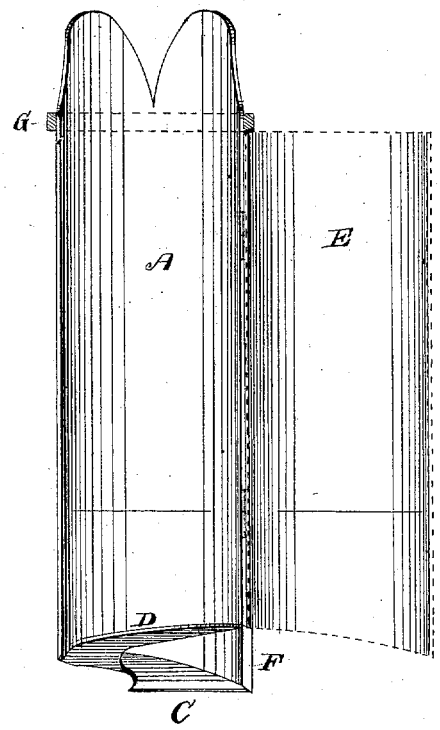
Figure 2:
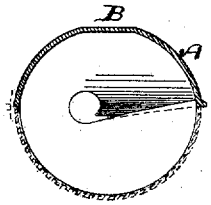

Figure 1 is a front elevation of my improved well-auger, and Fig. 2 is a transverse section of the same.

Similar letters of reference denote the same parts in the several figures of the drawings.

My invention relates to that class of earth-augers employed for boring wells; and has for its object to produce an instrument of the simplest construction and greatest capacity for rapid and effective work.

To this end the invention consists in an iron or steel auger, made in the form of a longitudinal section of a hollow cylinder, having a clear interior, unobstructed by an operating rod or handle of any kind, and provided with a circular bottom, cut or divided in one edge, and so shaped as to form a single boring-bit, with an enlarged opening for the passage of earth and stones into the auger, the bottom projecting through the entire open side of the cylinder and supporting the earth above the bit.

It also consists in the provision of means for admitting air into the well below the auger when the latter is filled with its load and in the act of being drawn out, in order to relieve the atmospheric pressure which would otherwise, by the tendency toward forming a vacuum under the auger, materially obstruct its withdrawal.

In the accompanying drawings, A represents the body of the auger, made in the form of a longitudinal section of a hollow cylinder, the section being about equal to one-half, although the arc may be more or less, if considered necessary or desirable. The body is entirely open upon one side and clear of any obstruction, because the operating-rod is attached to the top. Therefore, the whole interior is available for receiving a load of earth, and the passage thereof into the auger is perfectly free and clear.

D represents the bottom of the auger, which is made substantially circular and divided by a radial cut, so that the two ends shall be separated—one, C, being bent downward to form the cutting-bit, and the other left in a horizontal plane or bent upward to give the whole bottom a spiral curvature from the bit C to the upper edge.

This construction, it will be seen, produces a wide mouth for the entrance of earth and stones into the auger, while the shape of the bottom allows them to be easily fed.

The great advantage possessed by the single bit over a double bit in this class of earth-augers consists in the increased capacity for feeding the earth into the interior and for the passage of large stones.

Owing to the inclination which must be given to the bit in order to bore easily and effectively, only a certain amount of space can be allowed for the passage of earth into the auger. If, therefore, this space is divided into two parts by employing a double bit—say, one on each side—then its capacity for receiving stones is limited to the size of each part. If, however, the space is left entirely on one side by the use of a single bit, as in my invention, then stones of twice the size pass into the auger. Those stones which cannot enter a well-auger must be cut off or removed from the well by other means, the use of which first requires the removal of the auger from the well. Therefore any construction which increases the capacity of the auger to receive the stones is a great improvement, because it saves the time and labor required for its withdrawal from the well and the breaking or removal of the obstructing stone.

The bottom also sustains the load upon all sides of the center, and affords a complete support when the auger is lifted out of the well. Therefore, there is no necessity of providing a movable bottom or case to fasten the load within the auger, excepting when boring through sand, in which case a door, E, hinged to one side of the body, may be employed; but the door is closed to complete the cylinder before the auger enters the earth. The bottom, however, remains the same whether the door is closed or not, and performs the same function of sustaining the load all round the center.

The cutting-bit is upon one side of the center, and when the auger is in operation has a tendency to draw it laterally; whence the well is made of larger diameter than the auger, thereby making it easy to lift the auger out for discharging its load, and returning it again to continue the boring of the well. If a center-point were used this side draft would be overcome and its advantages lost, while the further and greater objection would result of arresting the progress of the auger into the earth when the point came in contact with a stone, for then it would simply turn on the stone as a bearing, and after the first revolution the bit would cease to cut.

Augers with two or more bits draw equally upon opposite sides, keeping the auger in the center of the well and causing it to bind against the sides. It is therefore hard to remove and apply, and requires greater power to operate it.

To increase the cutting capacity of the auger without employing a bit to project downward below the bottom, which would interfere with the side draft, I form a cutting-bit on the edge of the body adjoining the bit C, as shown at F, extending upward a short distance, and thus produce a cutting-angle which easily enters the earth and feeds the auger downward very fast.

When the auger is filled it is lifted out of the well, and swinging, as it does, from a derrick, it is readily turned up sidewise, so that the load will fall out of the open side by its own gravity. Water is used during the process of boring to diminish the friction and render the earth plastic and more compact when pressed into the auger.

A band, G, may be placed around the body, near the top, to assist in supporting the load of the auger—particularly when the load is a compact and tenacious substance, like clay—and hold it in place until it reaches the top of the ground and is ready to be discharged.

To assist in supplying air to the well below the auger, the body of the latter may be flattened on the back, as shown at B, to produce a passage between it and the side of the well, through which the air passes below the auger when the latter is withdrawn from the well, and therefore relieves the atmospheric pressure under the auger, which would otherwise interfere with its withdrawal.

Having thus described my invention, what I claim is—

1. A well-auger consisting of the longitudinal section of a hollow cylinder, having an unobstructed interior and a circular bottom projecting through the entire open side of the cylinder, and cut through at one side to form a single cutting-bit, and a spiral or circular support for the earth, extending within and projecting without the section forming the body and above the cutting-bit, substantially as described, for the purpose specified.

2. The combination of a hinged door with the body A and bottom D of the well-auger, substantially as described, for the purpose specified.

3. A well-auger formed on the outer surface for the admission of air into the well below it when the auger is loaded and in the act of being drawn from the well, substantially as described, for the purpose specified.

WILLIAM W. JILZ.

Witnesses:

E. A. ELLSWORTH,

M. CHURCH.